(12) United States Patent
Park et al.

(10) Patent No.: US 8,999,578 B2
(45) Date of Patent: Apr. 7, 2015

(54) POSITIVE ELECTRODE ACTIVE MATERIALS FOR LITHIUM SECONDARY BATTERY, METHOD FOR PREPARING THE SAME AND LITHIUM SECONDARY BATTERY COMPRISING THE SAME

(75) Inventors: Jungjoon Park, Yongin-si (KR); Suho Song, Yongin-si (KR)

(73) Assignee: Samsung SDI Co., Ltd., Yongsin-si (KR)

( * ) Notice: Subject to any disclaimer, the term of this patent is extended or adjusted under 35 U.S.C. 154(b) by 513 days.

(21) Appl. No.: 12/173,334

(22) Filed: Jul. 15, 2008

(65) Prior Publication Data

US 2009/0023067 A1     Jan. 22, 2009

(30) Foreign Application Priority Data

Jul. 16, 2007   (KR) .............................. 10-2007-71105

(51) Int. Cl.
*H01M 4/131* (2010.01)
*H01M 4/1391* (2010.01)
(Continued)

(52) U.S. Cl.
CPC ............... *H01M 4/131* (2013.01); *C01G 51/42* (2013.01); *C01G 53/50* (2013.01); *H01M 4/525* (2013.01);
(Continued)

(58) Field of Classification Search
USPC ........................... 429/223, 231.3, 231.95, 246
See application file for complete search history.

(56) References Cited

U.S. PATENT DOCUMENTS

| 5,308,720 A | 5/1994 | Kurokawa et al. |
| 5,626,635 A | 5/1997 | Yamaura et al. |

(Continued)

FOREIGN PATENT DOCUMENTS

| EP | 0 720 247 | 7/1996 |
| EP | 1 044 927 | 10/2000 |

(Continued)

OTHER PUBLICATIONS

Cao et al., Structural and electrochemical characteristics of Co and Al co-doped lithium nickelate cathode materials for lithium-ion batteries, Jan. 2004, Journal of Alloys and Compounds, 376, 282-286.*

(Continued)

*Primary Examiner* — Sean P Cullen
(74) *Attorney, Agent, or Firm* — Christie, Parker & Hale, LLP

(57) ABSTRACT

A positive electrode active material for a lithium secondary battery, the material represented by the formulas: $LiNi_{(1-x-y)}Co_xAl_yO_2$ or $LiNi_{(1-x-y)}Co_xMn_yO_2$ ($0.1 < x \leq 0.15$ and $0.03 < y < 0.1$), and whose X-ray diffraction peak intensity ratio $I(2\theta=45 \text{ degrees})/I(2\theta=18 \text{ degrees})$ of an X-ray diffraction peak intensities found in the vicinity of an X-ray diffraction-scanning angle $2\theta$ of about 45 degrees, to an X-ray diffraction peak intensity found in the vicinity of an X-ray diffraction-scanning angle $2\theta$ of about 18 degrees, is in the range of from 46% to 51%. The positive electrode active material is fabricated by mixing $Ni_{(1-x-y)}Co_xAl_yO_2$ or $Ni_{(1-x-y)}Co_xMn_yO_2$ ($0.1 < x \leq 0.15$ and $0.03 < y < 0.1$) with lithium hydrates ($LiOH.H_2O$); and calcinating the mixture at a temperature of 750° C., for more than 30 hrs, under an oxygen atmosphere.

9 Claims, 3 Drawing Sheets

(51) Int. Cl.
*H01M 4/525* (2010.01)
*H01M 10/0525* (2010.01)
*C01G 51/00* (2006.01)
*C01G 53/00* (2006.01)
*H01M 4/505* (2010.01)

(52) U.S. Cl.
CPC ........... *H01M 10/0525* (2013.01); *C01G 53/42* (2013.01); *C01P 2002/52* (2013.01); *C01P 2002/54* (2013.01); *C01P 2002/72* (2013.01); *C01P 2002/74* (2013.01); *C01P 2004/80* (2013.01); *C01P 2006/40* (2013.01); *H01M 4/505* (2013.01); *Y02E 60/122* (2013.01)

(56) References Cited

U.S. PATENT DOCUMENTS

| | | | |
|---|---|---|---|
| 6,045,771 A | 4/2000 | Matsubara et al. | |
| 6,306,787 B1 | 10/2001 | Sato et al. | |
| 2002/0119374 A1 | 8/2002 | Yang et al. | |
| 2005/0037263 A1* | 2/2005 | Wang et al. | 429/231.3 |
| 2005/0221168 A1* | 10/2005 | Dahn et al. | 429/105 |

FOREIGN PATENT DOCUMENTS

| | | |
|---|---|---|
| JP | 06-060887 | 3/1994 |
| JP | 10-069910 | 3/1998 |
| JP | 11-214002 | 8/1999 |
| JP | 2001-167761 | 6/2001 |
| JP | 2002-128526 | 5/2002 |
| JP | 2003-187801 | 7/2003 |
| JP | 2003-197256 | 7/2003 |
| JP | 2006-054107 | 2/2006 |
| JP | 2006-310181 | 11/2006 |
| JP | 2007123255 A * | 5/2007 |
| KR | 2005-93535 | 9/2005 |
| KR | 2006-105211 | 10/2006 |
| KR | 2006-128814 | 12/2006 |
| WO | WO 2007000286 A1 * | 1/2007 |

OTHER PUBLICATIONS

Bang et al., Contribution of the structural Changes of LiNi0.8Co0.15Al0.05O2 Cathodes on the Exothermic Reactions in Li-ion Cells, Feb. 2006, Journal of the Electrochemical Society, 153, A731-A737.*

Moriyama et al., Machine translation of JP 2007-123255 A, May 2007.*

Cao, Hui, et al., "Structural and Electrochemical Characteristics of Co and Al Co-Doped Lithium Nikelate Cathode Materials for Lithium-Ion Batteries", *Journal of Alloys and Compounds*, 376 (2004), pp. 282-286.

Office Action issued by European Patent Office in European Patent Application No. 08252416.6-2119 on Jul. 1, 2009.

Office Action issued by the State Intellectual Property Office in Chinese Patent Application No. 2008101335223 on Jan. 22, 2010.

Japanese Office action dated Aug. 2, 2011, for corresponding Japanese Patent application 2008-184725, 3 pages.

Patent Abstracts of Japan, and English machine translation of Japanese Publication 11-214002, listed above, 6 pages.

Patent Abstracts of Japan, and English machine translation of Japanese Publication 2001-167761, listed above, 11 pages.

Patent Abstracts of Japan, and English machine translation of Japanese Publication 2002-128526, listed above, 11 pages.

Patent Abstracts of Japan, and English machine translation of Japanese Publication 2003-187801, listed above, 13 pages.

Patent Abstracts of Japan, and English machine translation of Japanese Publication 2003-197256, listed above, 17 pages.

Patent Abstracts of Japan, and English machine translation of Japanese Publication 2006-054107, listed above, 21 pages.

Patent Abstracts of Japan, and English machine translation of Japanese Publication 2006-310181, listed above, 35 pages.

* cited by examiner

POSITIVE ELECTRODE ACTIVE MATERIALS FOR LITHIUM SECONDARY BATTERY, METHOD FOR PREPARING THE SAME AND LITHIUM SECONDARY BATTERY COMPRISING THE SAME

CROSS-REFERENCE TO RELATED APPLICATIONS

This application claims the benefit of Korean Application No. 2007-71105, filed Jul. 16, 2007, in the Korean Intellectual Property Office, the disclosure of which is incorporated herein by reference.

BACKGROUND OF THE INVENTION

1. Field of the Invention

Aspects of the present invention relate to a lithium secondary battery, and more particularly, to positive electrode active materials for a lithium secondary battery, a method of preparing the same, and a lithium secondary battery comprising the same.

2. Description of the Related Art

Lithium secondary batteries repetitively shift lithium ions between positive and negative electrodes. Lithium secondary batteries use materials that intercalate and deintercalate lithium ions, as positive and negative active materials. Typically, carbon-based, or metallic (including metal oxides) carbon composite materials, are used as the negative active materials, and lithium-metal oxides are used as the positive active materials.

Metallic cobalt is widely used as a positive electrode active material. In order to improve other characteristics, or to address resource scarcities, other metals, such as Ni, Mn, etc., (particularly transition metals) have been used as active materials. Although cobalt is largely employed as a positive electrode active material, lithium metal oxides, which are metal composites comprising lithium and other metals, are also used.

The metal composites may be crystalline metal composites, such as $LiMO_2$, $LiM_2O_4$, etc., wherein M may be represented by the formula: $Ni_{(1-x-y)}Co_xMn_y$ (wherein x and y are positive numbers less than 1, and $1-x-y$ is less than or equal to 1).

Lithium cobaltate ($LiCoO_2$) has stable charge/discharge characteristics, excellent electron conductivity, and flat discharge voltage characteristics. However, the development of other materials is desirable, due to the scarcity, expense, and toxicity of lithium cobaltate.

Lithium nickelate ($LiNiO_2$) has a layered structure similar to lithium cobaltate, has a large discharge capacity, but is difficult to form into a pure layered structure. Lithium nickelate is converted into $Li_xNi_{1-x}O$, which has a rock salt-type structure, due to reactive $Ni^{4+}$ ions produced during charging, while emitting excess oxygen, which leads to reduced cycle life and thermal instability. Nickel-cobalt based positive electrode active materials that substitute some of the nickel with cobalt, for example $LiNi_{1-x}Co_xO_2$ (where x=0.1~0.3), exhibit excellent charge/discharge and cycle life characteristics, but still have problems with thermal instability.

On the other hand, lithium metal oxides in positive electrode active materials may form a crystalline phase, or a mixed crystalline and amorphous phase, according to the formation method thereof. Even in the crystalline phase, lithium metal oxides may form a mixture of two different crystal structures. Such differences in crystal structure lead to differences in reactivity between active materials and ambient materials, during battery reactions.

If the positive electrode active materials participate in different side reactions with electrolyte components, in accordance with the different crystalline structures, by-product layers, such as a solid electrolyte interface (SEI) layer, can be formed on the surfaces of the positive active materials. The by-product layers have different ion conductivities from an electrolyte, thereby leading to a variation in cell resistance. An increase in the cell resistance results in a decreased in cell efficiency, degraded cell function, and a reduction in cycle life, due to the generation of heat.

In a high temperature storage test, nickel-cobalt based lithium ion batteries are stored at 60° C. for 50 days, at a 4.2 volt full charge. The batteries' resistances are then compared before and after the high-temperature storage. Such comparisons show increases in resistance of more than around 150% after the test.

SUMMARY OF THE INVENTION

An aspect of the present invention provides positive electrode active materials for a lithium secondary battery, a method of preparing same, and a lithium secondary battery comprising the same. The materials have improved high temperature storage characteristics and can inhibit the side reactions resulting from high temperature storage after charging the lithium secondary battery.

In accordance with one aspect of the present invention, provided a positive electrode material for a lithium secondary battery, represented by the formula: $LiMO_2$ (where M is a metal composite having at least one transition metal), and having at least two crystalline phases. An X-ray diffraction peak intensity ratio of a crystalline phase stable at high temperature, to a crystalline phase stable at low temperature, is at least 46%.

According to aspects of the present invention, the X-ray diffraction peak intensity ratio may be in the range of from 46% to 51%.

According to aspects of the present invention, the $LiMO_2$ may be $LiNi_{(1-x-y)}Co_xAl_yO_2$ or $LiNi_{(1-x-y)}Co_xMn_yO_2$ (where $0.1<x\leq0.15$ and $0.03<y<0.1$). The $LiNi_{(1-x-y)}Co_xAl_yO_2$ may be processed by mixing hydrates of a transition metal composite ($Ni_{0.8}Co_{0.15}Al_{0.05}(OH)_2$) with crystalline lithium hydrates ($LiOH.H_2O$), then subjecting the mixture to a calcination treatment at a temperature of 750° C., for from 29 hrs to 40 hrs. The X-ray diffraction peak intensity ratio, of a 104 crystalline structure to a 003 crystalline structure, may be in the range of from 46% to 51%.

In accordance with another aspect of the present invention, provided is a positive electrode active material for a lithium secondary battery, represented by the formulas: $Ni_{(1-x-y)}Co_xAl_yO_2$ or $Ni_{(1-x-y)}Co_xMn_yO_2$ (where $0.1<x\leq0.15$ and $0.03<y<0.1$), and whose X-ray diffraction peak intensity ratio $I_{(2\theta=45\ degrees)}/I_{(2\theta=18\ degrees)}$ of an X-ray diffraction-scanning angle $2\theta$ of about degrees, to an X-ray diffraction peak intensity of an X-ray diffraction-scanning angle $2\theta$ of about 18 degrees, may be in the range of from 46% to 51%.

According to aspects of the present invention, provided is a method of preparing positive electrode active materials for a lithium secondary battery, the method comprising: mixing $Ni_{(1-x-y)}Co_xAl_yO_2$ or $Ni_{(1-x-y)}Co_xMn_yO_2$ (where $0.1<x\leq0.15$ and $0.03<y<0.1$) with lithium hydrates ($LiOH.H_2O$), by stirring; and subjecting the mixture to a calcination treatment at a temperature of 750° C., for from 29 hrs to 40 hrs, under an oxygen atmosphere.

According to aspects of the present invention, provided is a lithium secondary battery, comprising: an electrode assembly having a positive electrode plate, a negative electrode plate, and a separator interposed between the positive and negative electrode plates; and a case for housing the electrode assembly. The positive electrode plate includes a positive electrode coating portion formed by coating a positive electrode active material on at least part of the surface of a positive electrode collector. The positive electrode active material can be represented by the formulas: $LiNi_{(1-x-y)}Co_xAl_yO_2$ or $LiNi_{(1-x-y)}Co_xMn_yO_2$ (where $0.1 < x \leq 0.15$ and $0.03 < y < 0.1$). The material has an X-ray diffraction peak intensity ratio $I_{(2\theta=45\ degrees)}/I_{(2\theta=18\ degrees)}$ of an X-ray diffraction-scanning angle $2\theta$ of about 45 degrees, to an X-ray diffraction peak intensity of an X-ray diffraction-scanning angle $2\theta$ of about 18 degrees, may be in the range of from 46% to 51%.

According to aspects of the present invention, the case may comprise a can having an opening through which the electrode assembly is inserted, and a cap assembly to seal the opening. The case may accommodate the electrode assembly and an electrolyte.

According to aspects of the present invention, when the positive electrode active materials are prepared with nickel-cobalt based metallic composites and aluminum or manganese, an X-ray diffraction light peak intensity ratio of a crystalline phase stable at high temperature, to a crystalline phase stable at low temperature, should be at least 46%. The high and low temperatures are based on the high temperature permitting the two crystalline phases to be shifted, such as calcination temperature. The ratio increases with an increase of the calcination temperature.

According to aspects of the present invention, as the ratio of crystals stable at a high temperature increases, the amount of the by-product formed on the surface of the positive electrode plate, or on the positive electrode active materials, by a reaction with electrolyte additives (even during long storage at the high temperature (60° C.)), decreases. That is, ion conductivity is maintained, even during storage at the high temperature, thereby preventing the decrease of charge/discharge efficiency or of cycle life. In order to increase the ratio mentioned above, calcination times can be increased, relative to conventional calcination times, when source materials are calcinated to form the positive electrode active materials.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings of which.

DETAILED DESCRIPTION OF EMBODIMENTS

Figure 1:
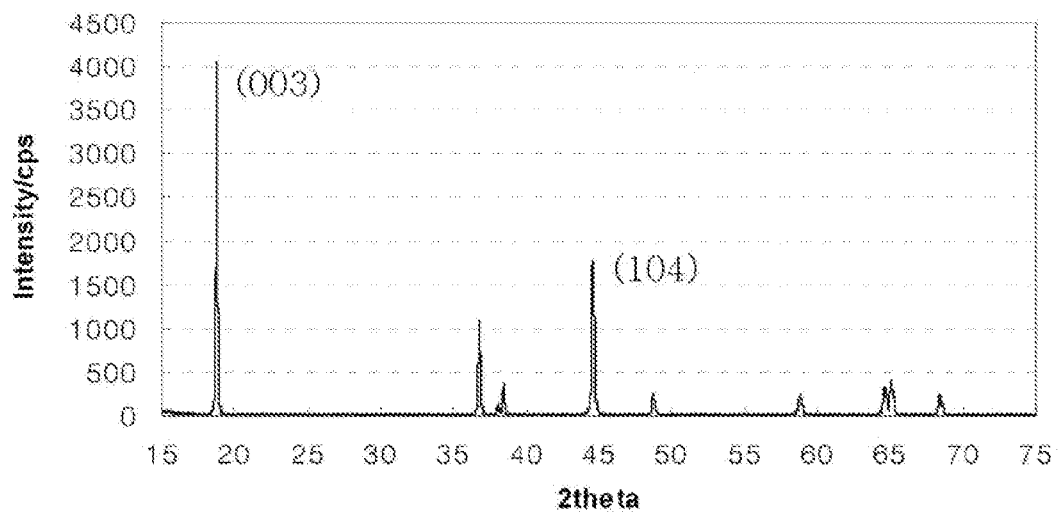
FIG. 1 is an X-ray diffraction (XRD) spectrum for an exemplary embodiment, in which the X-axis denotes a scanning angle range between incident and reflective angles, and the Y-axis denotes a diffraction line intensity.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

Calcination of Source Materials

The positive electrode active material, according to aspects of the present invention, can be formed by mixing and calcinating source materials. Although the calcination process can be varied, according to the composition of a metal composite (M), heating is typically carried out at from 700° C. to 900° C. For exceedingly high temperatures, cell-characteristics of positive electrode active materials tend to be degraded. For exceedingly low temperatures, it can be difficult to uniformly obtain desired compositions. The calcination is generally performed at a constant temperature and time. Calcination can be practiced by pre-heating a source material, at a temperature that is 300 to 400° C. lower than a calcination temperature, to remove water. The source material is then heated to the calcination temperature, at certain rate, so as to prevent thermal shock. Aspects of the present invention can further comprise annealing the source materials at temperatures 100 to 200° C. lower than the calcination temperature. The calcination is conducted under an oxidation atmosphere that typically contains high levels of oxygen.

The positive electrode active material may be prepared by forming a particulate lithium metal oxide ($LiMO_2$), which is made from a nickel-cobalt based metal composite having a primary metal of nickel, to which particulate aluminum or manganese source material is added, followed by uniform mixing in a solvent, and then calcinating at a temperature of 750° C. Typically, oxides, or materials that form oxides when calcinated, are used as the source material.

Hydrates of lithium and nitrate salts are widely used as a lithium source material. Oxides, hydrates, or nitrate salts of nickel or cobalt are typically used as a nickel source material and as a cobalt source material. Hydrates of nickel-cobalt, obtained from a reactive crystallization process, can be used to increase the efficiency of positive electrode active materials, through the uniform mixing of nickel and cobalt. Oxides, hydrates, or salts of aluminum nitrate are used as aluminum source materials.

The lithium content of the lithium metal oxides is based on 1 mole, but may contain a number of moles exceeding 1, in the range of 20% (i.e., 1 mole to 1.2 moles). Lowering the lithium content increases crystal formation in the positive electrode active materials, resulting in reduced battery charge/discharge capacities. In contrast, an excessive lithium content disrupts the conversion of source materials of lithium carbonates, etc., into lithium metal oxides, during the formation of the positive electrode active materials, and lithium carbonates or lithium hydrates can be precipitated from the positive electrode active materials.

The content of cobalt is in the range of from 0.1 to 0.2 mole, which allows the metal composite of nickel and cobalt to have good thermal stability and charge/discharge capacity.

When the nickel-cobalt based metal composite contains aluminum in a molar ratio of 0.03 to 0.1, relative to 1 mole of lithium, the metal composite has improved diffusion rates for lithium ions in the positive electrode active materials. Therefore, it is advantageous for applications in high-output batteries, such as electromotive instrumental batteries, or hybrid automotive batteries. The addition of aluminum helps the metal composite of nickel and cobalt to have stable crystalline structures during charging. Thus, when aluminum is contained in the metal composite, the positive electrode active materials maintain relatively stable crystalline structures, even in high temperature environments, to thereby prevent capacity reductions. However, since aluminum itself does not contribute largely to the charge/discharge capacity, it is generally disadvantageous to include more than 0.1 mole of aluminum.

When the metal composite based on nickel and cobalt further comprises manganese, the thermal stability of the positive electrode active materials can be improved. Manganese can increase thermal stability and safety, when included in a range of from trace amounts to, for example, 0.3 mole per 1 mole of lithium. If more than 0.3 mole of manganese is included, the thermal stability of the positive electrode active materials can increase, but the charge/discharge characteristics of the positive electrode active materials may decrease.

Figure 2:
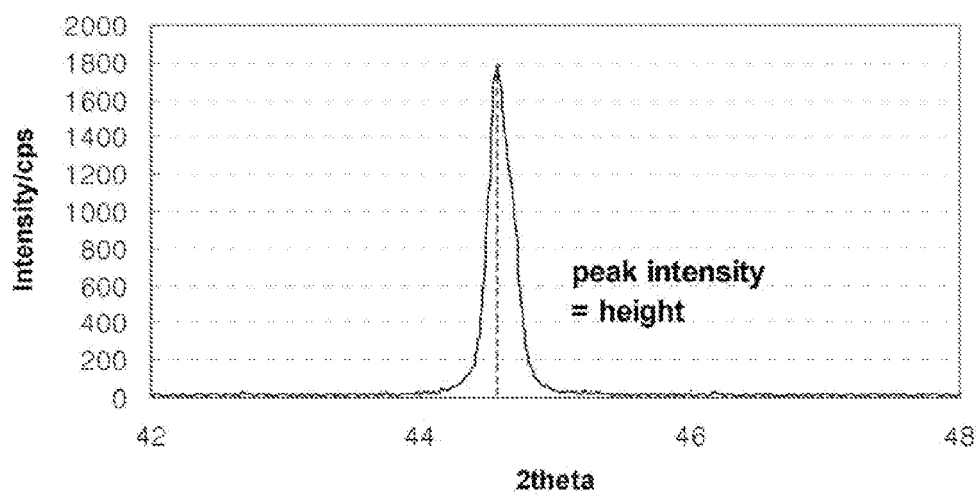
FIG. 2 is an X-ray diffraction spectrum illustrating a peak intensity of particular diffraction line, by enlarging the diffraction line of a 104 type crystal in FIG. 1.
Figure 3:
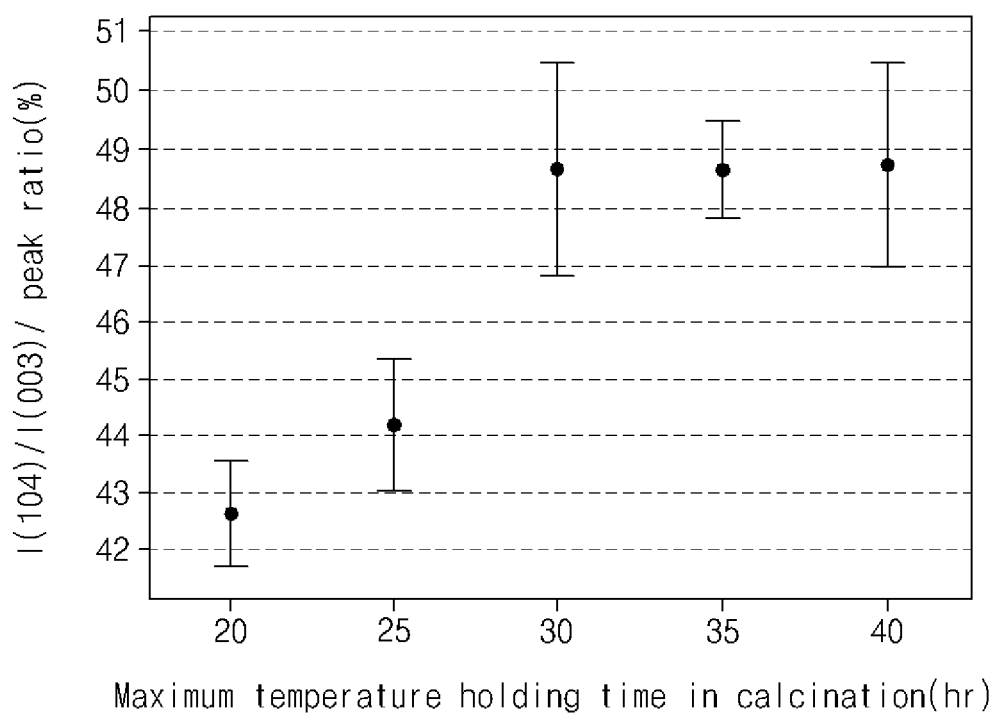
FIG. 3 is a graph illustrating an X-ray diffraction peak intensity ratio relationship between a 104-type and a 003 type crystal for the respective calcination times, in accordance with the exemplary embodiments and comparative embodiments.
Figure 4:
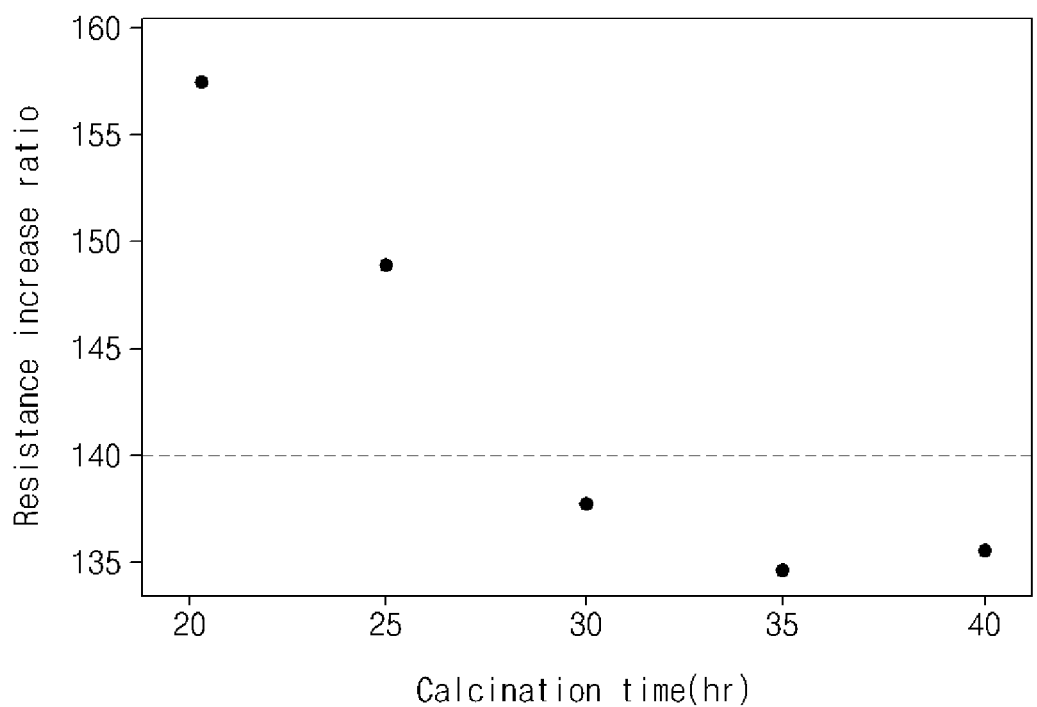
FIG. 4 is a graph illustrating resistance increase ratios during high temperature storage, relative to calcination times, in accordance with exemplary embodiments and comparative embodiments.

FIG. 1 shows an X-ray diffraction (XRD) spectrum, and in particular, 003 and 104 type crystal structure peaks; and FIG. 2 shows an X-ray diffraction spectrum illustrating the peak intensity the 104 type crystal structure of FIG. 1. FIG. 3 shows the X-ray diffraction peak intensity ratios for the positive electrode active materials, in accordance with exemplary embodiments and comparative embodiments; and FIG. 4 shows an increase of the resistance values for lithium secondary batteries using the positive electrode active materials of the exemplary embodiments and the comparative embodiments. The following Table 1 illustrates X-ray diffraction peak ratios for two crystalline structures of the positive electrode active materials of the exemplary embodiments and comparative embodiments, and increases in the internal resistances measured in high temperature storage tests.

With reference to Table 1 and FIGS. 3 and 4, in the exemplary embodiments 1 to 3, the X-ray diffraction peak intensity ratios, of a 104 crystalline structure to a 003 crystalline structure, is in the range of from 46% to 51%. Also, the internal resistance increase is more than 138% at calcination times of 30 hrs, 135% at 35 hrs, and 137% at 40 hrs, all of which are less than 140%.

Compared with the exemplary embodiments, the comparative embodiments show X-ray diffraction peak intensity ratios, of the 104 crystalline structure to the 003 crystalline structure, of about 43%, 44%, and 45%, respectively, including about 42% at the calcination times of 20 hrs or 25 hrs. The internal resistance increases are respectively 158% and 149%, for the calcinated samples, all of which are more than 140%. The basis of 140% indicates that the maximum value, illustrating the aspects of saturation, and the corresponding calcination time, is around 29 hrs. The interior resistance increases gradually decrease, even at comparatively lower calcination times, and therefore, have the effects on decreasing the internal resistance increase. However, 140% is adequate in consideration of a decrease in the increase calcination times and the corresponding efficiency.

The mixing ratio of $LiOH \cdot H_2O$ to $Ni_{0.8}CO_{0.15}Al_{0.05}(OH)_2$ was 1.03:1, on a molar basis, to obtain the exemplary embodiments and the comparative embodiments.

TABLE 1

| Embodiment | Positive electrode active materials | Calcination temperature | Calcination time | Diffraction line peak ratio $I_{(104)}/I_{(003)}$ | Resistance increase ratio after high temperature storage($\Delta R$) |
|---|---|---|---|---|---|
| Comparative Embodiment 1 | $LiOH \cdot H_2O$ + $Ni_{0.8}CO_{0.15}Al_{0.05}(OH)_2$ | 750° C. | 20 hrs | 42.8% 42.2% 42.9% | 158% |
| Comparative Embodiment 2 | $LiOH \cdot H_2O$ + $Ni_{0.8}CO_{0.15}Al_{0.05}(OH)_2$ | 750° C. | 25 hrs | 43.7% 44.6% 44.3% | 149% |
| Embodiment 1 | $LiOH \cdot H_2O$ + $Ni_{0.8}CO_{0.15}Al_{0.05}(OH)_2$ | 750° C. | 30 hrs | 47.8% 49.1% 49.1% | 138% |
| Embodiment 2 | $LiOH \cdot H_2O$ + $Ni_{0.8}CO_{0.15}Al_{0.05}(OH)_2$ | 750° C. | 35 hrs | 48.3% 49.0% 48.7% | 135% |
| Embodiment 3 | $LiOH \cdot H_2O$ + $Ni_{0.8}CO_{0.15}Al_{0.05}(OH)_2$ | 750° C. | 40 hrs | 48.9% 49.6% 48.1% | 137% |

Aspects of the present invention will be described in further detail with reference to specific Exemplary Embodiments and Comparative Embodiments. However, it should be understood that the present invention is not restricted by the specific Exemplary Embodiments.

Exemplary Embodiment 1

Lithium hydrate ($LiOH \cdot H_2O$) was mixed with a hydroxide of the transition metal composite ($Ni_{0.8}CO_{0.15}Al_{0.05}(OH)_2$), in a ratio of 1.03:1, and was calcinated at a temperature of 750° C., for 30 hrs, to obtain three samples of the nickel-cobalt based lithium metal oxide ($LiNi_{0.8}Co_{0.15}Al_{0.05}O_2$), which contained a trace amount of aluminum.

The samples were placed in X-ray diffractometer, and then the X-ray diffraction peak intensity ratios of 104 crystalline structures to 003 crystalline structures were determined to be 47.8%, 49.1%, and 49.1%, respectively. The results are shown Table 1 above.

Then, these samples were used as positive electrode active materials in lithium secondary batteries, which were charged at a Constant-Current/Constant-Voltage (CC-CV). The initial charge is carried out at a constant current of 4 A, and then the batteries were continuously charged by a constant voltage, after reaching a voltage of 4.2 V. Thereafter, when the current was dropped to 100 mA of a cut-off current, the charging was discontinued. The charged lithium secondary batteries were aged at 60° C., for 50 days, and then the direct current resistance of the batteries was detected.

Lithium secondary batteries fabricated in the same method as above were charged with the 4 A constant current and 4.2 V constant voltage, and the charging was discontinued at a cut-off current of 100 mA, followed by a charge suspension period of 2 hrs. Then a direct current resistance value inside the batteries was determined.

The lithium secondary batteries can be fabricated according to conventional manufacturing methods, which may comprises forming a positive electrode plate, a negative electrode plate and a separator, stacking or stacking and winding them to prepare an electrode assembly, inserting the electrode assembly into a case, and then sealing the case. Electrode taps are attached to the positive and negative electrode plates. The respective electrode plates can include electrode coating portions, formed by coating an electrode active material on electrode collectors. The coating of the positive electrode active material may comprise applying slurries containing the positive electrode active material on the surface of the positive electrode collectors, and then drying the same.

The case may be a pouch, or a can and a cap assembly. The electrode assembly is inserted into an opening of the can or pouch, and electrolytes may also be injected therein, and/or included in the form of a solid electrolyte separator.

The resistance increase ratios ($\Delta R$) were obtained by dividing a direct current resistance value, after aging at a high temperature, by a direct current resistance in a charged state at a normal temperature, and then multiplying the divided value by 100. The average value obtained therefrom was 138%.

The direct current resistance value refers to a discharge of 10 A for 10 seconds, 1 A for 10 seconds, and then 10 A for 4 seconds, while measuring voltages at 18 and 23 seconds after starting the discharge. The voltage difference is divided by 9 A.

An X-ray diffractometer employing Copper-Potassium (CuK) α-ray was used to analyze the X-ray diffraction. For example, a D8 ADVANCE diffractometer (Bruker Co.) can be used.

The diffraction conditions were as follows: a generator setting of 40 kV/30 mA; a scanning range of 15 to 70 degrees; a size per step of 0.04 degrees; a continuous scan; a scan time per step of 1.00 sec/s; a divergence slit of 1 degree, and a receiving slit of 0.1 mm.

Exemplary Embodiment 2

In Exemplary Embodiment 2, the procedure of Exemplary Embodiment 1 was repeated, except that calcination was performed at 750° C., for 35 hrs. The respective samples were placed in the X-ray diffractometer, and then the X-ray diffraction peak intensity ratios $I_{(104)}/I_{(003)}$ of a 104 crystalline structure to a 003 crystalline structure were determined, to thereby obtain results of 48.3%, 49.0% and 48.7%, respectively.

Then, lithium secondary batteries, including these positive electrode active materials, were constructed. Interior resistances before/after aging at 60° C., for 50 days, were determined. The average value of the resistance increase ratio ($\Delta R$) was 135%.

Exemplary Embodiment 3

The procedure of Exemplary Embodiment 1 was repeated, except that the calcination was performed at 750° C., for 40 hrs. The respective samples were placed in the X-ray diffractometer, and then the X-ray diffraction peak intensity ratios $I_{(104)}/I_{(003)}$ of a 104 crystalline structure to a 003 crystalline structure were determined, to thereby obtain 48.9%, 49.6% and 48.1%, respectively, which did not provide any useful differences with the calcination time (35 hrs) of Exemplary Embodiment 2.

Then, lithium secondary batteries were constructed using these positive electrode active materials. Interior resistances before/after aging at 60° C., for 50 days, were determined, and the resistance increase ratio of 137% was detected. This showed an increase relative to the calcination treatment of 35 hrs.

However, such differences are minute and are not regarded as significant, i.e. do not indicate an actual increase of the resistance increase ratios. In particular, the resistance increase ratio did not change, even with a calcination time of over 35 hrs.

Therefore, the calcination temperature of 750° C. was sufficient at calcination times of 30-40 hrs. Over the range, production costs increase in terms of heat treatment costs and time, thereby resulting in lowered productivity.

Comparative Embodiment 1

The procedure of Exemplary Embodiment 1 was repeated, except that calcination was conducted at 750° C., for 20 hrs. The samples were placed in the X-ray diffractometer, and then the X-ray diffraction peak intensity ratios $I_{(104)}/I_{(003)}$ of a 104 crystalline structure to a 003 crystalline structure were determined, to thereby obtain 42.8%, 42.2% and 42.9%, respectively.

Then, lithium secondary batteries, including these samples as the positive electrode active materials, were constructed. Interior resistances before/after aging at 60° C., for 50 days, were determined, and the average value of resistance increase ratio ($\Delta R$) was determined to be 158%.

Comparative Embodiment 2

The procedure of Exemplary Embodiment 1 was repeated, except the calcination was conducted at 750° C., for 25 hrs. The respective samples were placed in the X-ray diffractometer, and then the X-ray diffraction peak intensity ratios $I_{(104)}/I_{(003)}$ of a 104 crystalline structure to a 003 crystalline structure were determined, to thereby obtain 43.7%, 44.6% and 44.3%, respectively.

Then, lithium secondary batteries, including these samples as positive electrode active materials, were constructed. Interior resistances before/after aging at 60° C., for 50 days, were determined. The average value of the resistance increase ratio ($\Delta R$) was 149%.

As discussed above, according to aspects of the present invention, crystalline compositions of the positive electrode active materials, which make side reactions with electrolytes at high temperatures and pressures, which can be varied in lithium metal oxides having nickel-cobalt based metal composites, through changes in forming conditions for the positive electrode active materials. Accordingly, aspects of the present invention can advantageously lower increases in the interior resistance increase ratios of lithium secondary batteries, during charging at high temperatures, and can prevent deterioration, thereby increasing the cycle life of batteries.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. A positive electrode active material for a lithium secondary battery, comprising a lithiated metal oxide represented by the formula $LiNi_{(1-x-y)}Co_xAl_yO_2$, where $0.1<x\leq0.15$ and $0.03<y<0.1$,
   wherein the lithiated metal oxide has an X-ray diffraction peak intensity ratio of an X-ray diffraction peak intensity found in the vicinity of an X-ray diffraction-scanning angle $2\theta$ of about 45 degrees to an X-ray diffraction peak intensity found in the vicinity of an X-ray diffraction-scanning angle $2\theta$ of about 18 degrees ($I(2\theta=45$ degrees$)/I(2\theta=18)$)degrees) in the range of from 47.8% to 49.6%; and
   the lithiated metal oxide is formed by calcinating a lithiated metal oxide precursor at a temperature of about 750° C. to 900° C. for about 29 to about 40 hours.

2. A positive electrode active material for a lithium secondary battery, comprising a lithiated metal oxide represented by the formula: $LiNi_{(1-x-y)}Co_xAl_yO_2$, wherein $0.1<x\leq0.15$ and $0.03<y<0.1$, and wherein:
   the lithiated metal oxide is a nickel-cobalt based metallic composite having a first crystalline phase that is stable at a first temperature, and a second crystalline phase that is stable at a second temperature, the first temperature being higher than the second temperature;
   the second crystalline phase has a 003 crystalline structure having an X-ray diffraction peak intensity found in the vicinity of an X-ray diffraction-scanning angle $2\theta$ of about 18 degrees;
   the first crystalline phase has a 104 crystalline structure having an X-ray diffraction peak intensity found in the vicinity of an X-ray diffraction-scanning angle $2\theta$ of about 45 degrees;
   an X-ray diffraction peak intensity ratio, of the first crystalline phase to the second crystalline phase, $I(104)/I(003)$, is in the range of from 47.8% to 49.6%; and
   the lithiated metal oxide is formed by calcinating a lithiated metal oxide precursor at a temperature of about 750° C. to 900° C. for about 29 to about 40 hours.

3. The positive electrode active material as claimed in claim 2, wherein the lithiated metal oxide represented by the formula $LiNi_{(1-x-y)}Co_xAl_yO_2$ is formed by:
   mixing $Ni_{0.8}Co_{0.15}Al_{0.05}(OH)_2$ with a crystalline lithium hydrate to form a mixture, and
   wherein the calcinating of the lithiated metal oxide precursor at the temperature of about 750° C. to 900° C. for about 29 to about 40 hours comprises calcinating the mixture at a temperature of 750° C. for from 35 hrs to 40 hrs.

4. The positive electrode active material as claimed in claim 2, wherein the X-ray diffraction peaks are obtained using a copper-potassium (CuK) α-ray emitter.

5. A method of preparing a positive electrode active material for a lithium secondary battery, the method comprising:
   mixing a metal oxide represented by the formula $Ni_{(1-x-y)}Co_xAl_yO_2$, where $0.1<x\leq0.15$ and $0.03<y<0.1$ with lithium hydrates to form a mixture; and
   calcinating the mixture at a temperature of about 750° C. to 900° C. for about 29 to about 40 hours to form the positive electrode active material,
   wherein the positive electrode active material has an X-ray diffraction peak intensity ratio, of a first crystalline phase to a second crystalline phase, $I(104)/I(003)$, in the range of from 47.8% to 49.6%.

6. The method of claim 5, wherein the calcinating of the mixture at a temperature of about 750° C. to 900° C. for about 29 to about 40 hours comprises heating the mixture at a temperature of about 750° C., under an oxygen atmosphere.

7. A lithium secondary battery, comprising:
   an electrode assembly having a positive electrode plate, a negative electrode plate, and a separator interposed between the positive and negative electrode plates; and
   a case for housing the electrode assembly,
   wherein the positive electrode plate comprises positive electrode collector coated with a lithiated metal oxide represented by the formula: $LiNi_{(1-x-y)}Co_xAl_yO_2$, wherein $0.1<x\leq0.15$ and $0.03<y<0.1$, and wherein,
   the lithiated metal oxide is a nickel-cobalt based metallic composite having a first crystalline phase that is stable at a first temperature, and a second crystalline phase that is stable at a second temperature, the first temperature being higher than the second temperature,
   the second crystalline phase has a 003 crystalline structure having an X-ray diffraction peak intensity found in the vicinity of an X-ray diffraction-scanning angle $2\theta$ of about 18 degrees,
   the first crystalline phase has a 104 crystalline structure having an X-ray diffraction peak intensity found in the vicinity of an X-ray diffraction-scanning angle $2\theta$ of about 45 degrees,
   an X-ray diffraction peak intensity ratio, of the first crystalline phase to the second crystalline phase ($I(104)/I(003)$), is in the range of from 47.8% to 49.6%; and
   the lithiated metal oxide is formed by calcinating a lithiated metal oxide precursor at a temperature of about 750° C. to 900° C. for about 29 to about 40 hours.

8. The lithium secondary battery as claimed in claim 7, wherein the lithiated metal oxide represented by the formula $LiNi_{(1-x-y)}Co_xAl_yO_2$ is formed by:
   mixing $Ni_{0.8}Co_{0.15}Al_{0.05}(OH)_2$ with crystalline lithium hydrate to form a mixture, and
   wherein the calcinating of the lithiated metal oxide precursor at the temperature of about 750° C. to 900° C. for about 29 to about 40 hours comprises calcinating the mixture at a temperature of 750° C. for from 35 hrs to 40 hrs.

9. The lithium secondary battery as claimed in claim 7, wherein the case comprises: a can having an opening through which the electrode assembly is inserted; and
   a cap assembly to seal the opening.

* * * * *